(12) United States Patent
Porwal et al.

(10) Patent No.: US 12,541,416 B2
(45) Date of Patent: Feb. 3, 2026

(54) LANE BASED NORMALIZED HISTORICAL ERROR COUNTER VIEW FOR FAULTY LANE ISOLATION AND DISAMBIGUATION OF TRANSIENT VERSUS PERSISTENT ERRORS

(71) Applicant: Intel Corporation, Santa Clara, CA (US)

(72) Inventors: Gaurav Porwal, Portland, OR (US); Theodros Yigzaw, Sherwood, OR (US); Subhankar Panda, Portland, OR (US); John Holm, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 829 days.

(21) Appl. No.: 17/483,123

(22) Filed: Sep. 23, 2021

(65) Prior Publication Data

US 2023/0091969 A1    Mar. 23, 2023

(51) Int. Cl.
| | | |
|---|---|---|
| *G06F 11/00* | (2006.01) | |
| *G06F 11/07* | (2006.01) | |
| *G06F 13/40* | (2006.01) | |

(52) U.S. Cl.
CPC ........ *G06F 11/079* (2013.01); *G06F 11/0706* (2013.01); *G06F 11/076* (2013.01); *G06F 11/0787* (2013.01); *G06F 13/4068* (2013.01)

(58) Field of Classification Search
CPC .. G06F 11/079; G06F 11/0706; G06F 11/076; G06F 11/0787; G06F 11/0793; G06F 11/0727; G06F 11/073
See application file for complete search history.

(56) References Cited

U.S. PATENT DOCUMENTS 5,848,006 A    12/1998    Nagata
7,093,288 B1    8/2006    Hydrie et al.
(Continued)

FOREIGN PATENT DOCUMENTS

CN    108073423    5/2018
CN    113924557    1/2022
(Continued)

OTHER PUBLICATIONS

"Intel Data Streaming Accelerator Preliminary Architecture Specification," retrieved from https://software.intel.com/ sites/default/files/341204-intel-data-streaming-accelerator-spec-pdf on May 6, 2020, revision 1.0, Nov. 2019, 125 pages.
(Continued)

*Primary Examiner* — Katherine Lin
(74) *Attorney, Agent, or Firm* — NICHOLSON DE VOS WEBSTER & ELLIOTT LLP

(57) ABSTRACT

Methods and apparatus relating to lane based normalized historical error counter view for faulty lane isolation and disambiguation of transient versus persistent errors are described. In an embodiment, a plurality of storage entries store error information to be detected at one or more physical lanes of an interface. Faulty lane detection logic circuitry determines which of the one or more physical lanes is faulty or more likely to be faulty based at least in part on the stored error information for the one or more physical lanes of the interface. The stored error information comprises historical error details for the one or more physical lanes of the interface. Other embodiments are also disclosed and claimed.

23 Claims, 11 Drawing Sheets

(56) References Cited

U.S. PATENT DOCUMENTS

| | | |
|---|---|---|
| 7,191,341 B2 | 3/2007 | Paaske et al. |
| 7,287,140 B1 | 10/2007 | Asanovic et al. |
| 8,261,068 B1 | 9/2012 | Raizen et al. |
| 8,494,155 B1 | 7/2013 | Poo et al. |
| 8,516,269 B1 | 8/2013 | Hamlet et al. |
| 8,694,778 B2 | 4/2014 | Teuwen et al. |
| 8,819,685 B2 | 8/2014 | Zhang et al. |
| 8,850,225 B2 | 9/2014 | Noehring et al. |
| 8,954,788 B2 | 2/2015 | Abraham et al. |
| 9,064,135 B1 | 6/2015 | Poo et al. |
| 9,100,427 B2 | 8/2015 | Dubrovsky et al. |
| 9,251,380 B1 | 2/2016 | Au et al. |
| 9,525,671 B1 | 12/2016 | Worsley |
| 9,584,329 B1 | 2/2017 | Trimberger |
| 9,674,090 B2 | 6/2017 | Caulfield et al. |
| 9,721,113 B2 | 8/2017 | Park et al. |
| 9,798,900 B2 | 10/2017 | Oh et al. |
| 9,892,265 B1 | 2/2018 | Tripathy et al. |
| 10,078,754 B1 | 9/2018 | Brandwine et al. |
| 10,193,701 B2 | 1/2019 | Kim et al. |
| 10,521,618 B1 | 12/2019 | Zhang et al. |
| 10,742,421 B1 | 8/2020 | Wentz et al. |
| 10,896,267 B2 | 1/2021 | Ndu et al. |
| 10,956,346 B1 | 3/2021 | Ben-Yehuda et al. |
| 10,999,263 B2 | 5/2021 | Mundra et al. |
| 11,126,733 B2 | 9/2021 | Pappachan et al. |
| 11,205,003 B2 | 12/2021 | Patel et al. |
| 11,321,459 B2 | 5/2022 | Shen et al. |
| 11,477,125 B2 | 10/2022 | Browne et al. |
| 11,720,672 B2 | 8/2023 | Shen et al. |
| 11,847,067 B2 | 12/2023 | Chhabra et al. |
| 11,874,776 B2 | 1/2024 | Chhabra et al. |
| 2002/0097724 A1 | 7/2002 | Halme et al. |
| 2002/0129246 A1 | 9/2002 | Blumenau et al. |
| 2002/0133762 A1* | 9/2002 | Susnow ............... G06F 11/076 714/704 |
| 2003/0126468 A1 | 7/2003 | Markham |
| 2004/0123121 A1 | 6/2004 | Paaske et al. |
| 2004/0158711 A1 | 8/2004 | Zimmer |
| 2005/0021986 A1 | 1/2005 | Graunke et al. |
| 2005/0108532 A1 | 5/2005 | Bajikar |
| 2005/0232415 A1 | 10/2005 | Little et al. |
| 2006/0181942 A1 | 8/2006 | Cordero et al. |
| 2006/0193470 A1 | 8/2006 | Williams et al. |
| 2007/0180239 A1 | 8/2007 | Fujibayashi et al. |
| 2008/0002590 A1 | 1/2008 | Thomas et al. |
| 2008/0005706 A1 | 1/2008 | Sharma et al. |
| 2008/0063197 A1 | 3/2008 | Jaquette et al. |
| 2008/0065882 A1 | 3/2008 | Goodman et al. |
| 2008/0072071 A1 | 3/2008 | Forehand et al. |
| 2008/0222383 A1 | 9/2008 | Spracklen et al. |
| 2010/0005375 A1 | 1/2010 | Dell et al. |
| 2010/0023739 A1 | 1/2010 | Levit-Gurevich et al. |
| 2010/0054466 A1 | 3/2010 | Kerins et al. |
| 2011/0002461 A1 | 1/2011 | Erhart et al. |
| 2011/0060915 A1 | 3/2011 | Tal |
| 2011/0066837 A1 | 3/2011 | Lee et al. |
| 2011/0149737 A1 | 6/2011 | Muthiah et al. |
| 2011/0320921 A1 | 12/2011 | Gower et al. |
| 2012/0008768 A1 | 1/2012 | Mundra et al. |
| 2012/0030669 A1 | 2/2012 | Tsirkin |
| 2012/0054455 A1 | 3/2012 | Wang et al. |
| 2012/0072737 A1 | 3/2012 | Schrijen et al. |
| 2012/0084674 A1 | 4/2012 | Visosky |
| 2012/0137137 A1 | 5/2012 | Brickell et al. |
| 2012/0144205 A1 | 6/2012 | Shu et al. |
| 2012/0151224 A1 | 6/2012 | Koifman et al. |
| 2012/0151247 A1 | 6/2012 | Ferraiolo et al. |
| 2012/0254862 A1 | 10/2012 | Dong |
| 2013/0013934 A1 | 1/2013 | King et al. |
| 2013/0151761 A1 | 6/2013 | Kim et al. |
| 2013/0152099 A1 | 6/2013 | Bass et al. |
| 2014/0022976 A1 | 1/2014 | Chao et al. |
| 2014/0059681 A1 | 2/2014 | Dubrovsky et al. |
| 2014/0079220 A1 | 3/2014 | Wei et al. |
| 2014/0089658 A1 | 3/2014 | Raghuram et al. |
| 2014/0093074 A1 | 4/2014 | Gotze et al. |
| 2014/0122902 A1 | 5/2014 | Isozaki et al. |
| 2014/0133845 A1 | 5/2014 | Dahlfort et al. |
| 2014/0136680 A1 | 5/2014 | Joshi et al. |
| 2014/0258716 A1 | 9/2014 | MacMillan et al. |
| 2014/0270177 A1 | 9/2014 | Brickell et al. |
| 2014/0281456 A1 | 9/2014 | Mejia et al. |
| 2014/0310536 A1 | 10/2014 | Shacham |
| 2014/0359182 A1 | 12/2014 | Georgiev |
| 2015/0046702 A1 | 2/2015 | Paaske et al. |
| 2015/0188718 A1 | 7/2015 | Falk |
| 2015/0270956 A1 | 9/2015 | Basmov et al. |
| 2015/0288526 A1 | 10/2015 | Mclean et al. |
| 2015/0350231 A1 | 12/2015 | Dubrovsky et al. |
| 2015/0381459 A1 | 12/2015 | Xiao et al. |
| 2016/0019396 A1 | 1/2016 | Davis et al. |
| 2016/0094650 A1 | 3/2016 | De et al. |
| 2016/0139982 A1 | 5/2016 | Yu et al. |
| 2016/0246967 A1 | 8/2016 | Gross et al. |
| 2016/0323096 A1 | 11/2016 | Kara-Ivanov et al. |
| 2016/0364343 A1 | 12/2016 | Case et al. |
| 2016/0364582 A1 | 12/2016 | Cammarota et al. |
| 2017/0022494 A1 | 1/2017 | Hill et al. |
| 2017/0026171 A1 | 1/2017 | Lal et al. |
| 2017/0090815 A1 | 3/2017 | Kelner et al. |
| 2017/0091489 A1 | 3/2017 | Dragone et al. |
| 2017/0093567 A1 | 3/2017 | Gopal et al. |
| 2017/0134409 A1 | 5/2017 | Dubrovsky et al. |
| 2017/0149572 A1 | 5/2017 | Wallrabenstein |
| 2017/0180272 A1 | 6/2017 | Bernath |
| 2017/0214612 A1 | 7/2017 | Leitner et al. |
| 2017/0220494 A1 | 8/2017 | Shacham et al. |
| 2018/0088978 A1 | 3/2018 | Li et al. |
| 2018/0095750 A1 | 4/2018 | Drysdale et al. |
| 2018/0107608 A1 | 4/2018 | Kaplan et al. |
| 2018/0124085 A1 | 5/2018 | Frayman et al. |
| 2018/0189104 A1 | 7/2018 | Agarwal et al. |
| 2018/0204007 A1 | 7/2018 | Rangayyan |
| 2018/0367516 A1 | 12/2018 | Mundra et al. |
| 2019/0004810 A1 | 1/2019 | Jayasimha et al. |
| 2019/0004973 A1 | 1/2019 | Chhabra et al. |
| 2019/0042474 A1 | 2/2019 | Edirisooriya et al. |
| 2019/0075183 A1 | 3/2019 | Silberkasten et al. |
| 2019/0097818 A1 | 3/2019 | Lu et al. |
| 2019/0102293 A1 | 4/2019 | Li et al. |
| 2019/0102568 A1 | 4/2019 | Hausauer et al. |
| 2019/0102577 A1 | 4/2019 | Gueron et al. |
| 2019/0108130 A1 | 4/2019 | Durham et al. |
| 2019/0116052 A1 | 4/2019 | Kim et al. |
| 2019/0130103 A1 | 5/2019 | Shen et al. |
| 2019/0149478 A1 | 5/2019 | Mchugh et al. |
| 2019/0165956 A1 | 5/2019 | Adham et al. |
| 2019/0165957 A1 | 5/2019 | Abbott et al. |
| 2019/0190892 A1 | 6/2019 | Menachem et al. |
| 2019/0227827 A1 | 7/2019 | Zmudzinski et al. |
| 2019/0281025 A1 | 9/2019 | Harriman et al. |
| 2019/0311123 A1 | 10/2019 | Lal et al. |
| 2019/0324725 A1 | 10/2019 | Wang |
| 2019/0342093 A1 | 11/2019 | Chhabra et al. |
| 2019/0347125 A1 | 11/2019 | Sankaran et al. |
| 2019/0361807 A1 | 11/2019 | Desai et al. |
| 2020/0004703 A1 | 1/2020 | Sankaran et al. |
| 2020/0013451 A1 | 1/2020 | Son |
| 2020/0034549 A1 | 1/2020 | Lu |
| 2020/0052892 A1 | 2/2020 | Chhabra et al. |
| 2020/0099658 A1 | 3/2020 | Couillard et al. |
| 2020/0110888 A1 | 4/2020 | Kim et al. |
| 2020/0127861 A1 | 4/2020 | Doshi et al. |
| 2020/0134208 A1 | 4/2020 | Pappachan et al. |
| 2020/0143067 A1 | 5/2020 | Alemzadeh et al. |
| 2020/0159969 A1 | 5/2020 | Shanbhogue et al. |
| 2020/0175646 A1 | 6/2020 | Boyd et al. |
| 2020/0192842 A1 | 6/2020 | Ng et al. |
| 2020/0226263 A1 | 7/2020 | Patel et al. |
| 2020/0266995 A1 | 8/2020 | Gopal |
| 2020/0272562 A1 | 8/2020 | La Fratta et al. |
| 2020/0285492 A1 | 9/2020 | Mihajlovski et al. |
| 2020/0319913 A1 | 10/2020 | Kumar et al. |

(56) References Cited

U.S. PATENT DOCUMENTS

| | | |
|---|---|---|
| 2020/0342117 A1 | 10/2020 | Richards et al. |
| 2020/0387404 A1 | 12/2020 | Baxter et al. |
| 2020/0389433 A1 | 12/2020 | Zivic et al. |
| 2021/0004338 A1 | 1/2021 | Marolia et al. |
| 2021/0064549 A1 | 3/2021 | Zhang et al. |
| 2021/0149728 A1 | 5/2021 | Wood et al. |
| 2021/0157935 A1 | 5/2021 | Sood et al. |
| 2021/0224202 A1 | 7/2021 | Chhabra et al. |
| 2021/0232694 A1 | 7/2021 | Jannyavula Venkata et al. |
| 2021/0318966 A1 | 10/2021 | Chhabra et al. |
| 2021/0319121 A1 | 10/2021 | Dewan et al. |
| 2021/0319138 A1 | 10/2021 | Dewan et al. |
| 2021/0342182 A1 | 11/2021 | Kumar et al. |
| 2021/0365394 A1 | 11/2021 | Lu et al. |
| 2021/0382836 A1 | 12/2021 | Lantz et al. |
| 2022/0035749 A1 | 2/2022 | Chhabra et al. |
| 2022/0100687 A1 | 3/2022 | Sahin et al. |
| 2022/0182232 A1 | 6/2022 | Marson et al. |
| 2022/0197825 A1 | 6/2022 | Dewan et al. |
| 2022/0198027 A1 | 6/2022 | Chhabra et al. |
| 2022/0209966 A1 | 6/2022 | Chhabra et al. |
| 2022/0209967 A1 | 6/2022 | Chhabra et al. |
| 2022/0209968 A1 | 6/2022 | Chhabra et al. |
| 2022/0209969 A1 | 6/2022 | Chhabra et al. |
| 2022/0231991 A1 | 7/2022 | Blum Shem-Tov et al. |
| 2022/0276893 A1 | 9/2022 | Wood et al. |
| 2022/0318144 A1 | 10/2022 | Bajic et al. |
| 2022/0350503 A1 | 11/2022 | Tkacik et al. |
| 2022/0416997 A1 | 12/2022 | Dewan et al. |
| 2022/0417042 A1 | 12/2022 | Chhabra et al. |
| 2023/0032236 A1 | 2/2023 | Sankaran et al. |
| 2023/0032586 A1 | 2/2023 | Ranganathan et al. |
| 2023/0102178 A1 | 3/2023 | Chhabra et al. |
| 2023/0153159 A1 | 5/2023 | Kelkar et al. |
| 2024/0004990 A1 | 1/2024 | Kakaiya |
| 2024/0039860 A1 | 2/2024 | Arvind et al. |
| 2024/0054011 A1 | 2/2024 | Sankaran et al. |

FOREIGN PATENT DOCUMENTS

| | | |
|---|---|---|
| CN | 114647858 A | 6/2022 |
| CN | 115525335 A | 12/2022 |
| CN | 115686740 A | 2/2023 |
| CN | 117083612 A | 11/2023 |
| CN | 118696296 A | 9/2024 |
| DE | 102022112551 A1 | 12/2022 |
| EP | 3547130 A1 | 10/2019 |
| EP | 3720084 A1 | 10/2020 |
| EP | 3726392 A1 | 10/2020 |
| EP | 3757849 A1 | 12/2020 |
| EP | 3757853 A1 | 12/2020 |
| EP | 4016358 A1 | 6/2022 |
| EP | 4124965 A1 | 2/2023 |
| EP | 4152167 A1 | 3/2023 |
| EP | 4242893 A2 | 9/2023 |
| EP | 4322006 A1 | 2/2024 |
| GB | 2578135 A | 4/2020 |
| JP | 2021064378 A | 4/2021 |
| NL | 2029658 A | 7/2022 |
| WO | 2011160957 A1 | 12/2011 |
| WO | 2019066918 A1 | 4/2019 |
| WO | 2021035517 A1 | 3/2021 |
| WO | 2021080732 A1 | 4/2021 |
| WO | 2021162792 A1 | 8/2021 |
| WO | 2022132184 A1 | 6/2022 |
| WO | 2023009641 A1 | 2/2023 |
| WO | 2023113918 A1 | 6/2023 |
| WO | 2023173276 A1 | 9/2023 |

OTHER PUBLICATIONS

European Examination Report for app. no. 21198475.2, issued Jan. 4, 2024, 5 pages.
Extended European search report for application No. 23191363.3, issued Nov. 30, 2023, 11 pages.
International Preliminary Report on Patentability and Written Opinion (International app. No. PCT/US2022/021446), issued Dec. 14, 2023, 5 pages.
International Preliminary Report on Patentability and written opinion (international application No. PCT/US2022/021531), issued Dec. 14, 2023, 5 pages.
European Search Report for application No. 23156058.2, issued Oct. 26, 2023, 13 pages.
International Preliminary Report on Patentability for application No. PCT/US2020/066279, issued Jun. 13, 2023, 11 pages.
Non-final Office Action issued in U.S. Appl. No. 17/133,627, on Feb. 15, 2024, 23 pages.
U.S. Appl. No. 17/478,828, filed Sep. 17, 2021, Anand K. Enamandram.
U.S. Appl. No. 17/551,166, filed Dec. 14, 2021, Saurabh Gayen.
J. Won, A. Singla, E. Bertino and G. Bollella, "Decentralized Public Key Infrastructure for Internet-of-Things," MILCOM 2018—2018 IEEE Military Communications Conference (MILCOM), Los Angeles, CA, USA, 2018, pp. 907-913.
J. Zhu et al., "Enabling Rack-scale Confidential Computing using Heterogeneous Trusted Execution Environment," 2020 IEEE Symposium on Security and Privacy (SP), 2020, pp. 1450-1465.
Jiang, David, "Introducing the Intel Data Streaming Accelerator (Intel DSA)," retrieved on Dec. 1, 2021 from https://01.org/blogs/2019/introducing-intel-data-streaming-accelerator.
V. Krishnan, O. Serres and M. Blocksome, "COnfigurable Network Protocol Accelerator (COPA): An Integrated Networking/Accelerator Hardware/Software Framework," 2020 IEEE Symposium on High-Performance Interconnects (HOTI), 2020, pp. 17-24.
Wikipedia, "Disk encryption theory," downloaded from "https://en.wikipedia.org/wiki/Disk_encryption_theory#XTS" on Jul. 25, 2023, 7 pages.
European Patent Office examination report for Application No. 22188184.0, issued Jul. 22, 2024, 5 pages.
International Search Report for application No. PCT/CN2022/080895, 4 pages.
Notice of Allowance for U.S. Appl. No. 17/482,370, issued Jul. 30, 2024, 8 pages.
Written Opinion for application No. PCT/CN2022/080895, mailed Nov. 28, 2022, 4 pages.
Ionos, Hyperscale Computing—load balancing for large quantities of data, Aug. 24, 2020, downloaded Sep. 2, 2021, 8 pages.
Jack Keil Wolf, an introduction to error correcting codes, Part 1, ECE 154C, Spring 2008, 146 pages.
International Search Report and Written Opinion issued by KIPO on Oct. 28, 2021 for corresponding PCT/US2020/066279, 18 pages.
International Search Report and Written Opinion issued on Jun. 24, 2022 for PCT/US2022/021446.
International Search Report and Written Opinion issued on Jun. 30, 2022 for PCT/US2022/021531.
European Examination Report for application No. 22181090.6, issued Oct. 9, 2024, 7 pages.
Non-Final Office Action issued in U.S. Appl. No. 17/478,828, mailed Oct. 31, 2024, 9 pages.
Extended European Search Report for application No. 22188217.8, issued May 8, 2023, 13 pages.
International Search Report for application No. PCT/US2022/047184, issued Feb. 15, 2023, 3 pages.
International Search Report for International application No. PCT/US2022/038546, mailed Nov. 18, 2022, 4 pages.
Notice of Grant of NL application No. 2029658, Dutch Patent No. 2029658, issued Jun. 13, 2023, 6 pages.
Partial European Search Report for application No. 23156058.2, issued Jul. 26, 2023, 14 pages.
Search report issued by the Dutch patent office per EPO report (application 2029658), dated Mar. 22, 2023, 11 pages (with machine translation of cover letter).
U.S. Appl. No. 17/711,928, filed Apr. 1, 2022, Narayan Ranganathan.
U.S. Appl. No. 17/854,159, filed Jun. 30, 2022, Utkarsh Y. Kakaiya.
U.S. Appl. No. 17/854,322, filed Jun. 30, 2022, Utkarsh Y. Kakaiya.
U.S. Appl. No. 17/875,198, Jul. 27, 2022, Rajesh M. Sankaran.

(56) References Cited

OTHER PUBLICATIONS

IBM Cloud Education, "What is Multi-Tenant?" IBM Cloud Learn Hub, retrieved on Dec. 2, 2021 from https://www.ibm.com/cloud/learn/multi-tenant.
Intel Architecture Memory Encryption Technologies, Document No. 336907-003US, Apr. 2021.
Intel Corporation. Intel® Architecture Memory Encryption Technologies Specification. Ref: #336907-001US. Rev 1.1. Dec. 2017. (Year: 2017).
Intel® Architecture Memory Encryption Technologies Specification, Revision 1.3, Apr. 2021.
Iyer, Shyamkumar, "Introducing Smart Data Acceleration Interface (SDXI)," In-Memory Computing Summit (Oct. 28, 2020).
Final Office Action issued in U.S. Appl. No. 17/133,627, issued Aug. 5, 2024, 27 pages.
Final Office Action issued in U.S. Appl. No. 17/358,284 on Feb. 22, 2024, 22 pages.
Non-Final Office Action in U.S. Appl. No. 17/711,928, mailed Aug. 26, 2024, 22 pages.
U.S. Appl. No. 17/357,973, filed Jun. 24, 2021, Prashant Dewan.
U.S. Appl. No. 17/358,238, filed Jun. 25, 2021, Siddhartha Chhabra.
M. Werner, T. Unterluggauer, R. Schilling, D. Schaffenrath and S. Mangard, "Transparent memory encryption and authentication," 2017 27th International Conference on Field Programmable Logic and Applications (FPL), Ghent, Belgium, 2017, pp. 1-6.
Samsung Unveils Industry-First Memory Module Incorporating New CXL interconnect Standard, May 11, 2021, downloaded Jun. 13, 2021, from https://news.samsung.com, 5 pages.
Smart Data Accelerator Interface ("SDXI") Specification, Version 1.0, SNIA, Nov. 28, 2022, 144 pages.
Unterluggauer T, Werner M, Mangard S. Meas: memory encryption and authentication secure against side-channel attacks. J Cryptogr Eng. 2019;9(2):137-158. doi: 10.1007/s13389-018-0180-2. Epub Jan. 25, 2018. PMID: 31231603; PMCID: PMC6555441.
Notice of Allowance issued on Aug. 30, 2021 for U.S. Appl. No. 16/832,138.
Written Opinion for application No. PCT/US2022/047184, issued Feb. 15, 2023, 6 pages.
Written Opinion of the International Searching Authority for International application No. PCT/US2022/038546, mailed Nov. 18, 2022, 5 pages.
European Search Report for application No. 22188217.8-1203, issued Feb. 3, 2023, 16 pages.
Advanced Micro Devices, "Tiered Memory Page Migration Operations Guide," publication # 58151, Revision 0.51, May 2023, 33 pages.
Intel Data Streaming Accelerator Architecture Specification, Revision 2.0, Sep. 2022, 253 pages.
Intel Scalable I/O Virtualization, Technical Specification, Rev. 1.1, Sep. 2020, 29 pages.
Intel TDX Connect Architecture Specification, Mar. 2023, 40 pages.
Zhao et al., "Contiguitas: The Pursuit of Physical Memory Contiguity in Datacenters," Jun. 2023, 15 pages.
Office Action issued in U.S. Appl. No. 17/357,973, filed Oct. 1, 2024, 14 pages.
European Search Report, Application No. EP22181090, issued Dec. 7, 2022, 7 pages.
Extended European Search Report for Application No. 22188184.0-1224, issued Jan. 25, 2023, 8 pages.
Extended European Search Report issued on Feb. 28, 2022 for EP Application No. 21198475.2.
"Intel Data Streaming Accelerator Architecture Specification," Revision 1.2, 197 pages, Sep. 2021.
"Intel® QuickAssist Technology (Intel® QAT)—Data Center Performance," downloaded Jun. 12, 2022, from "https://www.intel.com/content/www/us/en/architecture-and-technology/intel-quick-assist-technology-overview.html," 6 pages.
"Smart Data Accelerator Interface ("SDXI") Specification," Version 0.9.0 rev 1, SNIA Advancing Storage & Information Technology, 109 pages.
C. Priebe, K. Vaswani and M. Costa, "EnclaveDB: A Secure Database Using SGX," 2018 IEEE Symposium on Security and Privacy (SP), San Francisco, CA, USA, 2018, pp. 264-278.
GDSII, retrieved from https://en.wikipedia.org/w/index.php?title=GDSII&oldid=1003588402 on Jun. 15, 2021.
Gunlu, Onur, et al. "Secure and Reliable Key Agreement with Physical Unclonable Functions," Entropy 2018, vol. 20, May 3, 2018, pp. 1-19.
Non-final office action for U.S. Appl. No. 17/358,238, mailed Aug. 8, 2024, 30 pages.
"Intel Data Streaming Accelerator Architecture Specification, revision 1.1," Oct. 2020, 194 pages.
"Intel Virtualization Technology for Directed I/O Architecture Specification," Jun. 2018, 275 pages.
ASIC—definition by BAE Systems (Year: 2021).
Extended European search report in application No. 22850259.7, issued Jan. 27, 2025, 9 pages.
Final Office Action issued in U.S. Appl. No. 17/711,928, mailed Feb. 13, 2025, 26 pages.
Final Office Action issued in U.S. Appl. No. 17/875,198, mailed Feb. 21, 2025, 44 pages.
Non-final office action in U.S. Appl. No. 17/133,627, mailed Feb. 20, 2025, 28 pages.
Non-final Office Action issued in U.S. Appl. No. 17/551,166, mailed Feb. 12, 2025, 30 pages.

* cited by examiner

| | Counter 0/1 | Lane 0 | Lane 1 | Lane 2 | Lane 3 | Lane 4 | Lane 5 | ... | Lane n | Counter 2 – Total | Counter 2 – Normalization |
|---|---|---|---|---|---|---|---|---|---|---|---|
| | CRC/ECC Synd | 59:57 | | | | | | | 2:0 | 7:0 | 15:8 |
| No Error | 0xf245 | | | | | | | | | | 15:8 |
| Error 0 | 0xab32 | 0 | 1 | 1 | 0 | 0 | 0 | 0 | 0 | 0 | |
| Error 1 | 0x365a | 0 | 1 | 2 | 1 | 0 | 0 | 0 | 0 | 2 | |
| Error 2 | 0x8923 | 0 | 1 | 3 | 2 | 0 | 0 | 0 | 0 | 4 | |
| Error 3 | 0xaf7e | 0 | 2 | 3 | 2 | 0 | 0 | 0 | 0 | 6 | |
| Error 4 | 0x9344 | 1 | 3 | 3 | 2 | 0 | 0 | 0 | 0 | 8 | |
| Error 5 | 0x78ba | 0 | 2 | 3 | 2 | 0 | 0 | 0 | 0 | 10 | 1 |
| ... | | 0 | 2 | 3 | 1 | 0 | 0 | 0 | 0 | 12 | 2 |
| Error M | 0x067a | 0 | 2 | 3 | 1 | 1 | 1 | 0 | 0 | 14 | 3 |
| | | | | | | | | | | 16 | 4 |

FIG. 3B

| Config Register |||||||
|---|---|---|---|---|---|---|
| Feature Enable/Disable | HW Action Enable/Disable | SW Action Enable/Disable | | | Normalized Bits [3:0] | Lane Count [7:0] |
| | | | | | X | Y |

FIG. 4A

| Error Register 0 |||||||||
|---|---|---|---|---|---|---|---|---|
| Lane n [X:0] | ... | ... | ... | ... | ... | Lane 0 [X:0] | Lane 0 [X:0] | Lane 0 [X:0] |

FIG. 4B

| Error Register 1 ||||||||||
|---|---|---|---|---|---|---|---|---|---|
| RSVD | RSVD | RSVD | Lane Y [X:0] | ... | ... | ... | ... | ... | ... |

FIG. 4C

| Error Info 1 |||
|---|---|---|
| TSC Offset | Cumulative Errors [31:0] | Overflow Counter [15:0] |

FIG. 4D

| Action Config ||||||||
|---|---|---|---|---|---|---|---|
| ... | ... | ... | ... | Throttle Bandwidth | Reduce Speed | Lane Failover Force | Force Spare Lane | Lane Staggering Enable/Disable | Low Power State Enable/Disable |

FIG. 4E

LANE BASED NORMALIZED HISTORICAL ERROR COUNTER VIEW FOR FAULTY LANE ISOLATION AND DISAMBIGUATION OF TRANSIENT VERSUS PERSISTENT ERRORS

FIELD

The present disclosure generally relates to the field of electronics. More particularly, an embodiment relates to lane based normalized historical error counter view for faulty lane isolation and disambiguation of transient versus persistent errors.

BACKGROUND

Generally, a "hyperscaler" refers to the operator of a data center that offers scalable cloud computing services. Hyperscaler often face issues with unwanted and unscheduled reboots in their systems, disrupting the overall fleet operations and causing many millions of dollars in revenue loss.

Hence, reduction of unwanted and unscheduled reboots in data centers can greatly increase uptime and reduce losses.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 3A, 3B, 4A, 4B, 4C, 4D, and 4E illustrate sample registers for lanes in a system, according to some embodiments.

DETAILED DESCRIPTION

Figure 1:
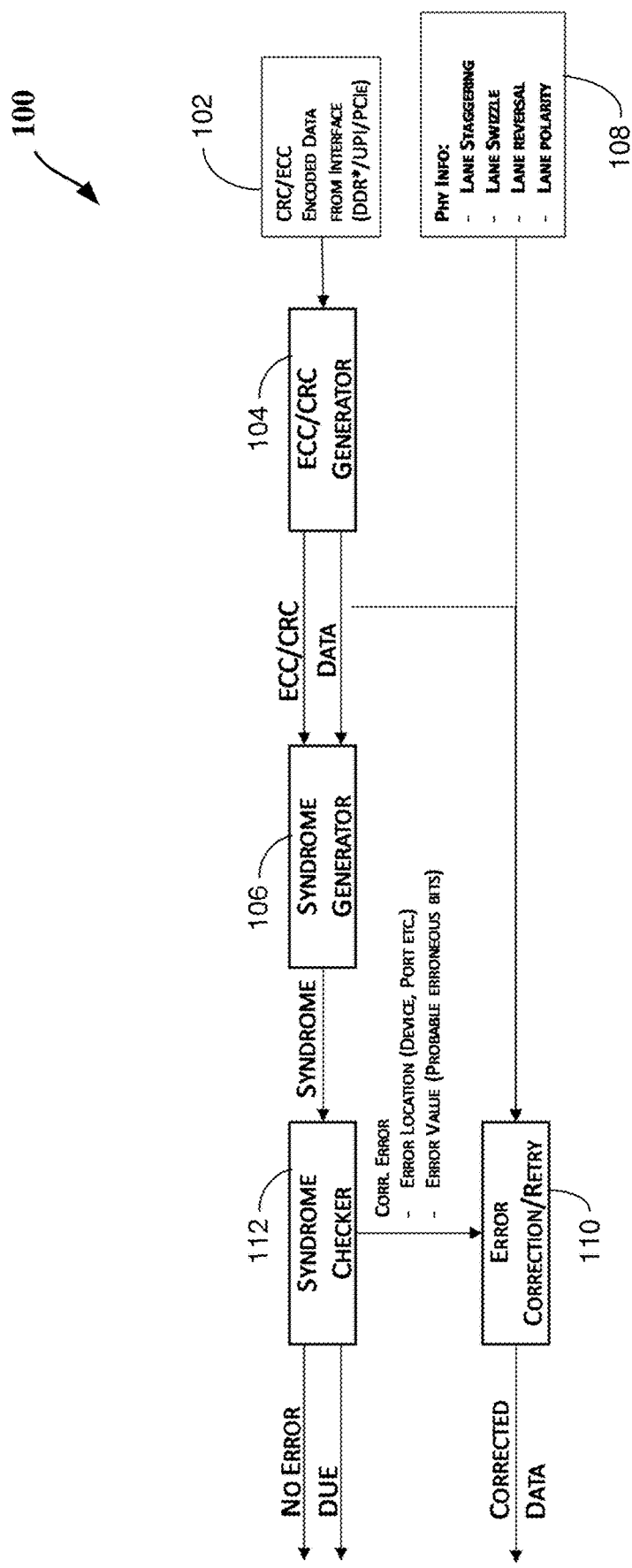
FIG. 1 illustrates a block diagram of a system to provide error correction and logging, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, hyperscaler often face issues with unwanted and unscheduled reboots in their systems, disrupting the overall fleet operations and causing many millions of dollars in revenue loss. These disruptions may be due to: (a) error disambiguation (transient vs. persistent) can lead to incorrect FRU (field replaceable unit) and can cause unscheduled downtime, e.g., leading to unnecessary customer returns; (b) link instability is one of the common causes of system fault (uncorrectable state), leading to crashes (where the instability could be due to many reasons including electrical (aging, routing, voltage/current, impedances etc.), mechanical (incorrect or less contact, interference, hindrance), etc.); and/or (c) software/firmware needs to find if the fault could potentially have been caused by a single/multiple bad-lanes or whether it is a result of random errors across multiple lanes (e.g., electrically noisy environment). Unfortunately, this diagnosis and disambiguation is not easy to achieve with current implementations. Also, while complicated methods may have been proposed to determine the role of a particular lane as a failure cause, these are generally time consuming and costly. They may also require more software/firmware intervention such as polling, etc.

Moreover, most links (such as UPI (Ultra Path Interconnect) and PCIe (Peripheral Component Interconnect express)) are protected using CRC (cyclical redundancy code) like error detection mechanisms and then use ECC (error correcting code) or a retry mechanism for correction while some use ECC for both detection and correction (such as Double Data Rate (DDR) Random Access Memory (RAM)). When an error is detected, while retrials are in progress, the remainder syndrome from detection algorithm (CRC or ECC) is saved in a register which can then be utilized by software or firmware layers to decode the specific physical lanes which could have caused the issue. There are also leaky bucket types of schemes available, but they do not provide any disambiguation and are also devoid of true historical diagnostics and do not adapt with error rate in-time, leading to similar pitfalls as mentioned before. Some solutions may even use correctable interrupt (such as CMCI (Correctable Machine Check Interrupt)) to notify the software that an error has occurred on the respective interface either using thresholds or per error notifications.

However, these solutions assume that correctable errors caused due to lane issues are wide apart in time. This assumption is not true in the real-world scenarios that can be observed across data centers and other deployments, and only holds for theoretical ideal for a good platform. When a physical lane is experiencing an electrical issue or fault, it generates multiple errors in correctable or uncorrectable realm. This implies that for each such error software has to perform the complete translation reading multiple registers for a single fault isolation.

This creates many scenarios where the current solution falls short including: (a) for any consecutive errors in nearby temporal vicinity (e.g., a rate higher than single digits/sec), syndromes cannot provide any support as hardware errors are generated at much higher speed than software reads can succeed; (b) race conditions between software reads and hardware errors can lead to incorrect translation and hence incorrect action of service, never leading to a robust solution to bring the platform back from service state; (c) syndromes provide limited disambiguation for one to few bits and not across the lane map; (d) there is no hint and prior history for software/firmware to take pre-emptive action (i.e., lacking predictive failure analysis); (e) for uncorrectable errors, it is not possible to detect specific lanes; and/or (f) many electrical parameters or configurations have to be understood by software/firmware, e.g., using lane polarity, lane staggering/swizzle, lane reversal, etc. to complete the isolation.

To this end, some embodiments provide lane based normalized historical error counter view for faulty lane isolation and disambiguation of transient versus persistent errors. An embodiment introduces a novel way of storing/recording a historical view of the error occurrences per lane, across an interface. For example, ECC or CRC algorithms' Syndrome or remainder function may be utilized, e.g., combined with the available swizzle and lane information in hardware logic to maintain error count increment per lane. As discussed herein, a "lane" generally refers to a physical lane having one or more physical wires, cables, or traces to propagate signals (e.g., using differential signals (e.g., with two wires, cables, or traces) and/or single ended signals (e.g., each having one wire, cable, or trace)). In turn, each "interface" or communication "channel" is considered to have multiple lanes.

At least one embodiment generates an overall per lane error map and provides both historical errors details and probabilistic bad lanes and has several advantages including: (1) providing a lane map of potential faulty lane; (2) multiple lanes showing errors or faults can also expose generic electrical noise; (3) fast and consistent fault isolation; (4) robust error handling; (5) consistent and more accurate prediction of failure; and/or (6) consistent architecture across multiple interface types. Further, embodiments are applicable and scalable to any physical link based high speed TO (input-output, also referred to as "I/O") protocol stack, which supports error detection and correction logic such as CRC, ECC, retries, etc. This is thus applicable to stacks such as DDR, UPI, PCIe, CXL (compute express link), etc.

The various error behaviors observed on an interfaces can be broken down into two different categories described below:

(1) Transient Errors (which are correctable errors or "CEs")—Transient errors are temporary, and they can occur due to several reasons including:
  (a) Lane issues such as electrical issues (e.g., degradation, skew, or shmoo (where a "shmoo" plot can be used to provide a graphical display of the response of a component or system varying over a range of conditions or inputs), thermal issues (e.g., heating effects, environmental effects), or mechanical issues (e.g., bad contacts, interferences, etc.)
  (b) Faulty device or end-point issues such as DRAM, PCIe or others. While some embodiments discuss identifying lane issues, the absence of lane issues (per one or more embodiments) helps with mitigating this disambiguation and eliminate lane issues from consideration. Also, lane based errors may occur during some transactions, but may not be visible across all transactions depending on the switching characteristics and needs. This implies that the link will observe a non-continuous pattern of errors spread across the data and may be centered on one or more lanes.

(2) Persistent Errors (which are correctable errors for certain bits/lanes and uncorrectable/DUE beyond, where "DUE" stands for Detectable/Detected Uncorrectable Error)—Persistent errors occur, as the name suggests, across every data transfer on the interface. Some of the examples of persistent errors are stuck-at-fault (0 or 1), bent or broken pins, no-contacts (or electrical detection), etc.

To protect against these errors, either CRC check and retry or ECC correction algorithms can be used. With CRC check and retry, a retry index and retry value for a First In First Out (FIFO) buffer may be maintained and only when the retry check is successful, the data is consumed and the entries de-allocated. With ECC, the ECC algorithm helps narrow down the probable bad bits and then either a retry mechanism or a simpler correction algorithm (such as remainder/residue calculator) can be used to correct the bad bits. When the correction is successful (CEs), bad data is discarded, but the check residue or syndrome is generated and recorded. Software or firmware (e.g., BIOS (basic input-output system), an OOB (out of band) component/agent (e.g., including any component that accesses information (such as processor state) via a sideband as opposed to an Operating System (OS) which would be considered in-band (for example, a Baseboard Management Controller (BMC), a Platform Environment Control Interface (PECI) agent, a System Management Bus (SMBBUS) agent, etc.), or OS) read this syndrome and use the interface-based algorithm (e.g., for DDR, UPI or PCIe) to determine which device/port/channel or lane is possibly the root cause.

If many software error samples are collected, it is assumed that a transient error due to lane can be identified and system can then take several next actions (such as electrical tuning, manual inspection, board checkout, or re-work) to bring it back into a functional low error rate. If the correction is unsuccessful (e.g., DUE), since the erroneous bits cannot be narrowed down, the syndrome is not used by software for any determination. Software relies on past data collected and stored in another database to help to build a history for this fault. This is a big assumption and many implementers have struggled to correlate this across the various interfaces. These issues can lead incorrect translations or incorrect lane isolation. Further, lost syndrome data can lead to incorrect fault diagnosis.

FIG. 1 illustrates a block diagram of a system 100 to provide error correction and logging, according to an embodiment. One embodiment provides a more nuanced error mapping by decoding the syndrome in hardware and accumulating the errors in a new set of lane-based error accumulation registers. This functionality is above and beyond any existing solutions and allows for a highly efficient, much more accurate faulty lane isolation, reduced software complexity, and/or more time for action for catastrophic errors. Such embodiments are crucial in a modern data center where prediction of errors should happen in a timely manner to allow for safe data recovery and continuation of service. While some embodiments store the lane-based error accumulation data in registers, embodiments are not limited to use of registers and any type of storage device or memory location available in the system may be used, such as any of the storage devices discussed herein with reference to various figures.

Referring to FIG. 1, CRC/ECC encoded data 102 is received from the interface (e.g., DDR, UPI, PCIe, etc.) at ECC/CRC generator logic 104. The ECC/CRC generator logic 104 then generates an ECC or CRC and data based on the received encoded data 102 and sends it to a syndrome generator logic 106 which in turn generates a syndrome for the ECC/CRC and data combination from logic 104. The output from the ECC/CRC generator logic 104 and physical (PHY) lane information 108 (such as lane staggering, lane swizzle, lane reversal, lane polarity, etc.) is transmitted to an error correction/retry logic 110, which generates the corrected data accordingly. A syndrome checker logic 112 generates one or more signals based on the syndrome it receives from the logic 106. These one or more signals may indicate no error or DUE as shown in FIG. 1. Also, the error correction/retry logic 110 may receive correction error information (e.g., including error location (e.g., device, port, etc.), error value (probably erroneous bits), etc.) from the syndrome checker 112 which can be used to generate the corrected data.

Accordingly, FIG. 1 shows how the available data 108 from the physical (PHY) lane side of the interface can be utilized to perform a hardware-based syndrome decode. Hence, at least one embodiment can remove or reduce the software burden associated with multi-cycle operations and improve error response time as well as reduce delay in error detection.

Figure 2:
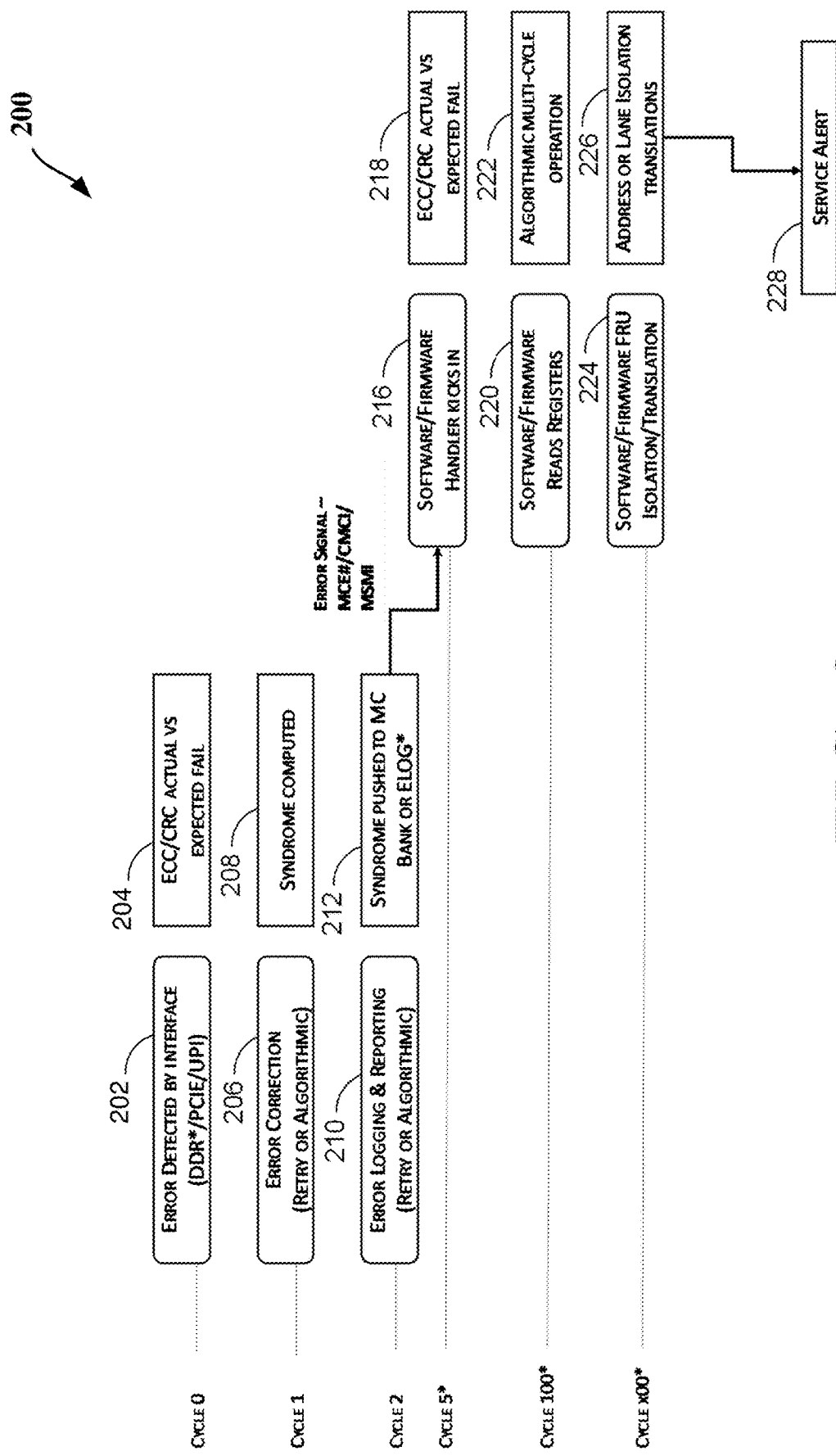
FIG. 2 illustrates a flow diagram of a method to detect and handle errors, according to an embodiment.

FIG. 2 illustrates a flow diagram of a method 200 to detect and handle errors, according to an embodiment. One or more components of the system 100 of FIG. 1 may be used to perform one or more of the operations of method 200.

More particularly, as shown in FIG. 2, at cycle 0, an error is detected by the interface (202) and it is determined whether the actual value matches an expected value (204) (and if there is no match, then this is considered a failure). During the next two cycles, the error correction (206), bad lane computation (208), logging/reporting (210), and per lane error incrementations (212) are performed (e.g., by the logic components discussed with reference to FIG. 1). Subsequently, an error signal is generated (214) (such as an MCE (machine check exception) signal, CMCI (correctable system management interrupt) signal, MSMI (machine check system management interrupt), etc.).

In response to the error signal generation (214), software/firmware hander is invoked (216) to determine whether the actual value matches an expected value (with a mismatch considered a failure) (218), software/firmware reads the registers (220) to perform tasks associate with a multi-cycle operation (222), software/firmware determines FRU isolation based on data stored in the register(s) (224), and determine whether a new translation is needed (226). Based on whether a new translation is needed, a service alert may be generated (228). As discussed herein, "translation" generally refers to decoding/determining which lane in a channel is bad (e.g., based on a packet being scrambled and/or larger than the lane width).

Figure 3A:
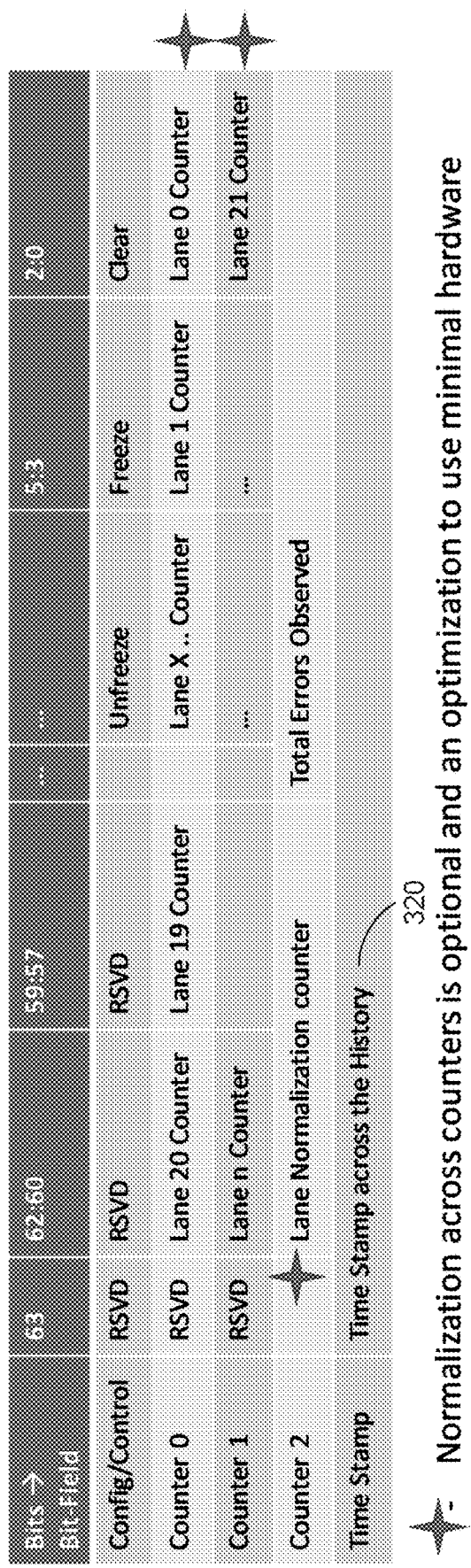

FIG. 3A shows a sample set of 64-bit registers, according to an embodiment. More particularly, one embodiment adds (e.g., 64-bit) counters for storing accumulation values per lane, e.g., showcasing probable bad lanes at any time with stored history. While some embodiments may utilize 64-bit counters, other size counters may also be used like 32-bit, 128-bit, 256-bit, etc.

As shown in FIG. 3A, Counter 2 may be a lane normalization counter, e.g., providing normalization across counters optionally. This allows for an optimization to use minimal hardware across a single instantiation. If this optimization is not needed or enable, each lane can be optionally expanded across multiple counters, e.g., for the life to the system runtime.

With this new addition, it is easier to observe the potentially bad lanes and take corrective actions and potentially predict imminent failures ahead in time as shown in FIG. 3B which illustrates a plurality of counters for lanes in the system, according to an embodiment. The highlighting of cells in FIG. 3B is intended to depict a transition. For example, Error 1 shows Lane 2 and Lane 3 transition from Error 0.

As shown in FIG. 3B, an optional normalization may be provided between lanes (302). For example, when the error count reaches a threshold value on any lane, and new errors appear on the same lane, other lane counters may be decremented (while keeping the erroneous lane at the same (e.g., threshold) value). Once normalized, prior operations/behavior may be resumed/continued.

Additionally, even when the latest error(s) are observed on lanes 4 and 5 (304)), prior/historic errors would still point to lane 2 as having the highest error count, indicating probable and potential diagnosis that lane 2 is a bad lane. Software can then observe and verify from the stored historic that lane 2 has recorded the highest number of faults. Hence, lane 2 is more probable to be bad and not lanes 4 and 5 with the most recent errors (which could be random), and appropriate/correct diagnosis and action(s) may be taken.

An additional error counter keeps incrementing with every new error (306), with probably error lane counts. This may be an error counter implemented in an MCA (machine check architecture) bank register, or another register (e.g., that is not part of MCA), in an embodiment.

Further, with a time stamp counter and correlation across the history (320), it is easier to manage this data in a hyperscaler fleet and run analytics off the fleet to take corrective and/or pre-emptive actions before any system crash can occur. Accordingly one or more embodiments can resolve several issues and deficiencies of prior solutions, with a more efficient and software scalable methodology. This allows for a faster and more accurate fault diagnosis and improves overall error disambiguation, which is a key requirement for hyperscaler data center designs. Embodiments are not limited to a single protocol or bus/interconnect and scale well across the designs even with newer architectures such as CXL, pooled memory, or any other buses/interconnects which offer any error detection and correction techniques.

FIGS. 4A, 4B, 4C, 4D, and 4E illustrate sample registers, according to some embodiments. These registers may be configurable to allow for interface-based normalization. Software may access these registers to disambiguate errors (e.g., in-field). Further, the register(s) may allow for a more adaptive software flow for mitigations.

More particularly, FIG. 4A shows a sample configuration register that may store information about enablement/disablement of various features, corresponding hardware (HW) and/or software (SW) action(s), normalized bits (which may occur when a counter exceeds its size and it reduces itself and others to reflect relative accumulated values, for example, FIG. 3B, Error 4 to Error 5 have normalization on lane 0 and lane 2), and lane count. FIG. 4B illustrates a sample register for storing error counts for a plurality of lanes. FIG. 4C shows a sample error register with some reserved (RSVD) fields and a field for Lane Y[X:0] (for example, for multiple interfaces like PCIe or DRAM, which can have different widths (e.g., x16 PCIe will have lane Y=16, and the counter implementation can vary where X=4, 6, etc.). FIG. 4D illustrates a sample register storing information about TSC (time stamp counter) offset (e.g., to provide a time stamp such as discussed with reference to item 320 of FIG. 3A), cumulative errors, an overflow counter (which may be updated/incremented each time a normalization occurs). FIG. 4E shows a sample action configuration register for storing information/flags about various action including throttle bandwidth (e.g., to increase inter-packet gap to carry less data), reduce speed (e.g., to down grade speed, such as like PCIe Gen 2 to Gen 1 downgrade or DDR5-4800 MHz to 4000 MHz), lane failover force (e.g., to disabling a fraction (e.g., half) of the lanes), force spare lane (e.g., to provide a redundant lane, and optionally switch an incorrectly operating active lane to a spare lane), lane staggering enable/disable, and low power state enable/disable.

Moreover, the register set of FIGS. 4A, 4B, 4C, 4D, and 4E may be accessed by software and/or hardware controlled policies, allowing for a more intuitive usage model, a higher self-healing and error prediction, and disambiguation capabilities, leading to more reliable systems with less system crashes and availability.

Error disambiguation for lane vs. component error is a critical requirement for hyperscaler designs at Cloud Service Provider's (CSP's) end. Some current implementations only offers syndrome-based error disambiguation, which relies heavily on software flows to collect data and then analyze for anomalies. As discussed earlier, this is a significant problem as 'race conditions' between subsequent errors and error reading software can cause critical data to be lost, and the speed at which software can continuously read these errors can create a bottleneck for accurate and reliable disambiguation. To be more accurate, the challenges are: (a) race conditions between error handling and error reporting; (b) limited to 'n' errors across lane map; (c) cumbersome software algorithm per interface in the hardware; (d) delayed action or prediction; and/or (e) inconsistent error reporting and anomaly detection. Hence, one or more embodiments provide a solution to addressing these set of issues and ensuring a healthy predictive failure algorithm as well as a more nuanced self-healing capability set.

Figure 5:
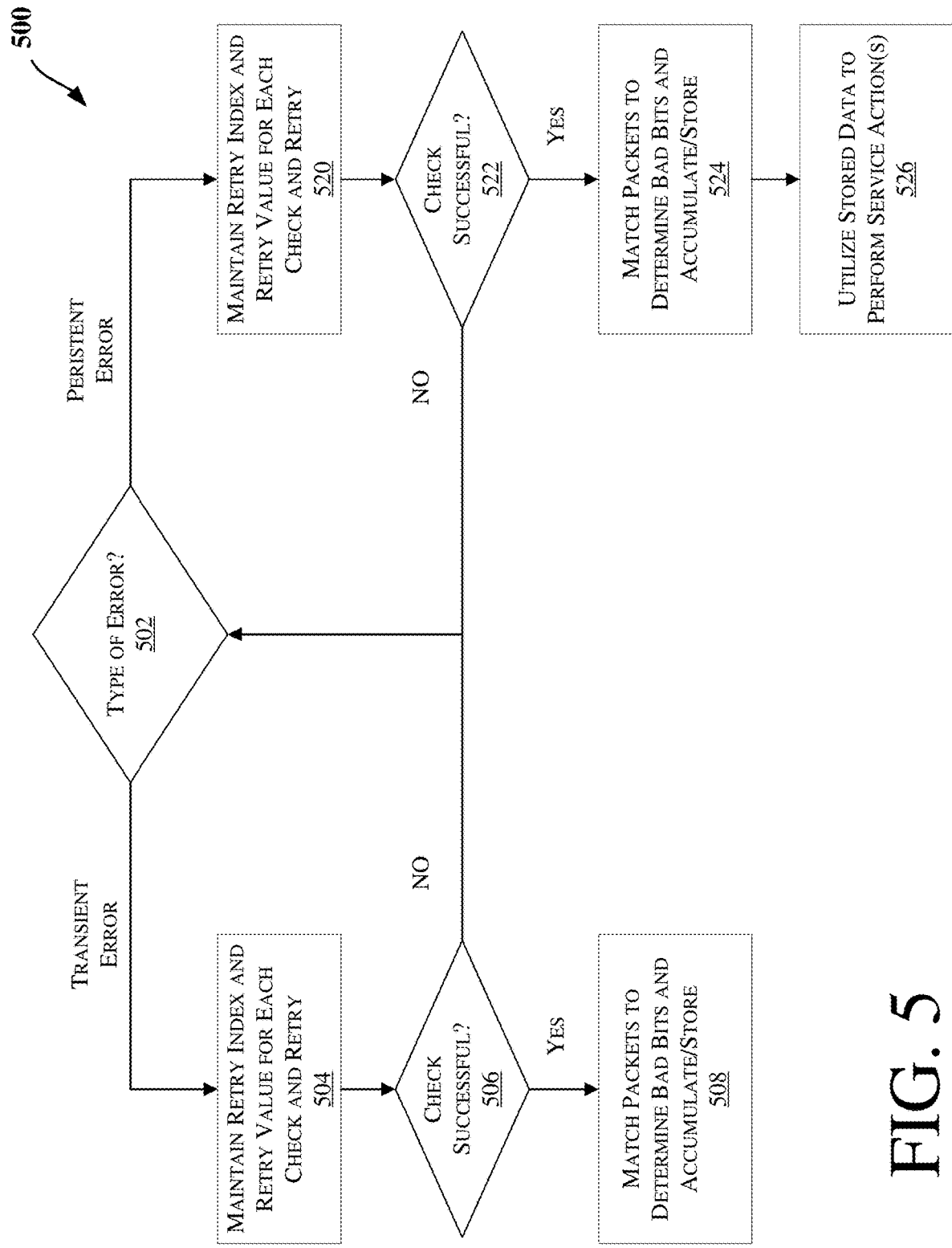
FIG. 5 illustrates a flow diagram of a method to provide lane based normalized for faulty lane isolation and disambiguation of transient versus persistent errors, according to an embodiment.

FIG. 5 illustrates a flow diagram of a method 500 to provide lane based normalized for faulty lane isolation and disambiguation of transient versus persistent errors, according to an embodiment. One or more of the operations of method 500 may be performed by the components discussed with reference to FIGS. 1-4E and/or 6A-10 as further discussed below, including for example the system 100, a processor, and/or an interconnect or link control logic (such as interface 740 of FIG. 7, controller hub 830 of FIG. 8, bus controller unit 916 of FIG. 9, etc.).

Referring to FIGS. 1 through 5, after detecting an error (e.g., as discussed with reference to FIG. 1), operation 502 determines the type of error. If the error is determined be a transient error (which are correctable errors or "CEs"), operation 504 maintains/updates a retry index and a retry value for each check and retry operation, respectively. In an embodiment, only when the retry check is successful, the data is consumed and entries de-allocated.

At an operation 506, a check is performed and if the check is successful (before the bad data is discarded), the incoming data packet is matched/compared to the stored data packet to determine the bad bits at an operation 508. If the check is unsuccessful, method 500 resumes at 502 to handle the next error. At operation 508, for each frame (multiple frames form a packet), the bad bits are collapsed or accumulated. The collapsed/accumulated information is stored, e.g., in a counter such as discussed with reference to FIGS. 1-4E. Each frame is mapped to a specific physical (PHY) lane map already, so the physical lane bit map and frame error bit indicator together would demonstrate which lanes are generating more errors (see, e.g., FIG. 3A). The accumulation of the bad bits across the frame continue being mapped into the corresponding counter. In an embodiment, the counters can wrap around as follows: if all bits of specific frame are not null (or greater than 0), remove the least common value from each and retain the remainder in the counter.

If operation 506 determines the detected error to be persistent which are correctable errors for certain bits/lanes and uncorrectable/DUE beyond), operations 520, 522, and 524 are performed in a similar fashion to operations 504, 506, and 508, respectively, and a history of errors would point back to a set of potential bad lanes. For persistent errors, retry would continuously fail leading to a link/interface reset (if link specification permits, e.g., UPI, PCIe, etc.). At operation 526, system software (e.g., BIOS, OOB or OS) or other logic can utilize the stored/accumulated data to cause execution of one or more service actions. Further, during link reset state machines, training would be reapplied and lanes which are found to be bad can potentially be mapped out (e.g., using a failover mechanism to use a different lane instead) or signalled to software. Hence, at any given point, the counter can show which lane is faultier than other lanes. Also, if the error rate on a lane is high, an interrupt or alert can be raised/generated, e.g., even before the system detects an uncorrectable error.

Additionally, some embodiments may be applied in computing systems that include one or more processors (e.g., where the one or more processors may include one or more processor cores), such as those discussed with reference to FIG. 1 et seq., including for example a desktop computer, a work station, a computer server, a server blade, or a mobile computing device. The mobile computing device may include a smartphone, tablet, UMPC (Ultra-Mobile Personal Computer), laptop computer, Ultrabook™ computing device, wearable devices (such as a smart watch, smart ring, smart bracelet, or smart glasses), etc.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU (Central Processing Unit) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

Figure 6:
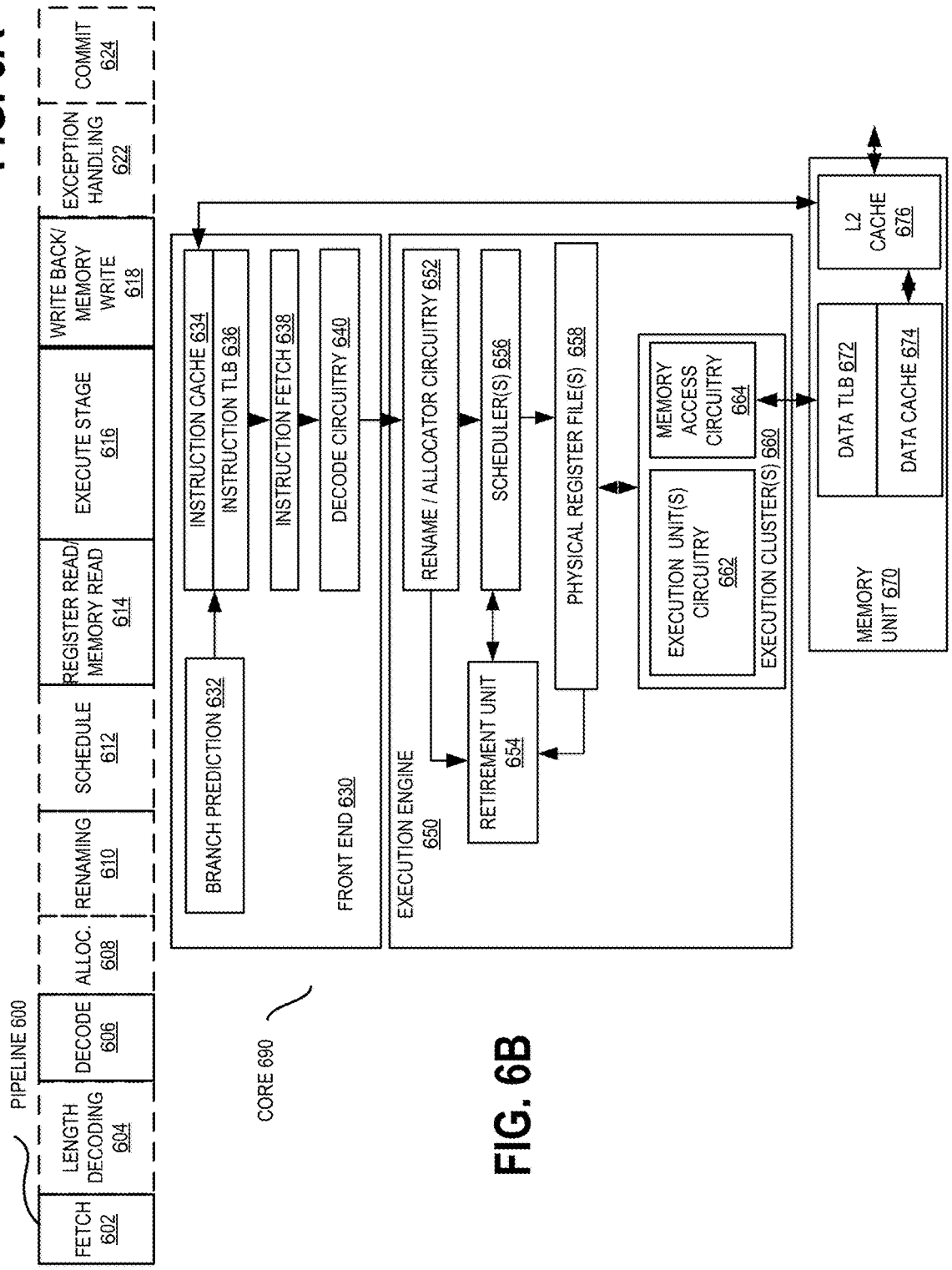
FIG. 6A is a block diagram illustrating both an exemplary in-order pipeline and an exemplary register renaming, out-of-order issue/execution pipeline according to embodiments.
FIG. 6B is a block diagram illustrating both an exemplary embodiment of an in-order architecture core and an exemplary register renaming, out-of-order issue/execution architecture core to be included in a processor according to embodiments.

FIG. 6A is a block diagram illustrating both an exemplary in-order pipeline and an exemplary register renaming, out-of-order issue/execution pipeline according to embodiments. FIG. 6B is a block diagram illustrating both an exemplary embodiment of an in-order architecture core and an exemplary register renaming, out-of-order issue/execution architecture core to be included in a processor according to embodiments. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a writemask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 6) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 690 includes logic to support a packed data instruction set extension (e.g., AVX1, AVX2), thereby allowing the operations used by many multimedia applications to be performed using packed data.

Figure 7:
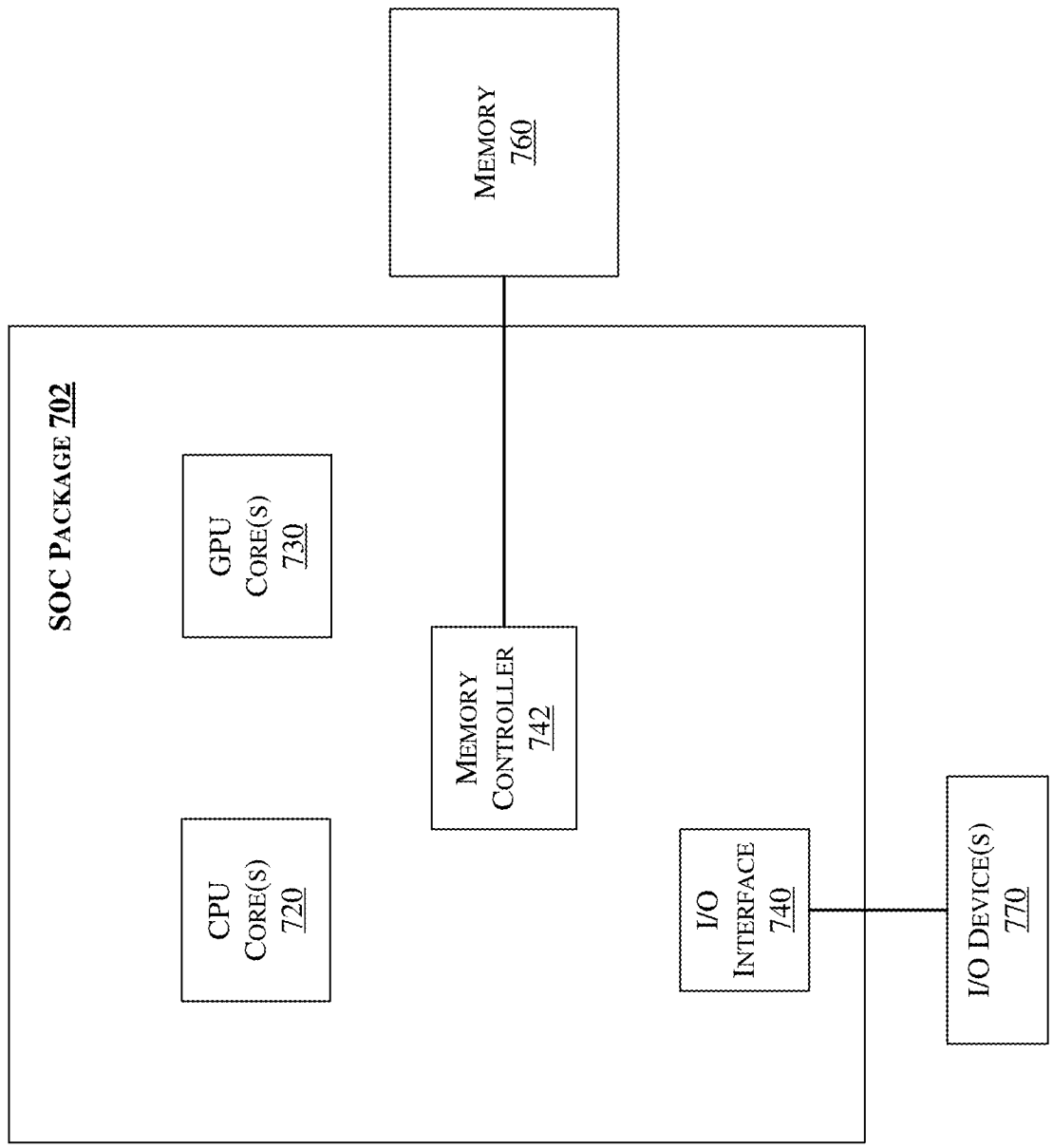
FIG. 7 illustrates a block diagram of an SOC (System On Chip) package in accordance with an embodiment.

FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 702 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like.

Figure 8:
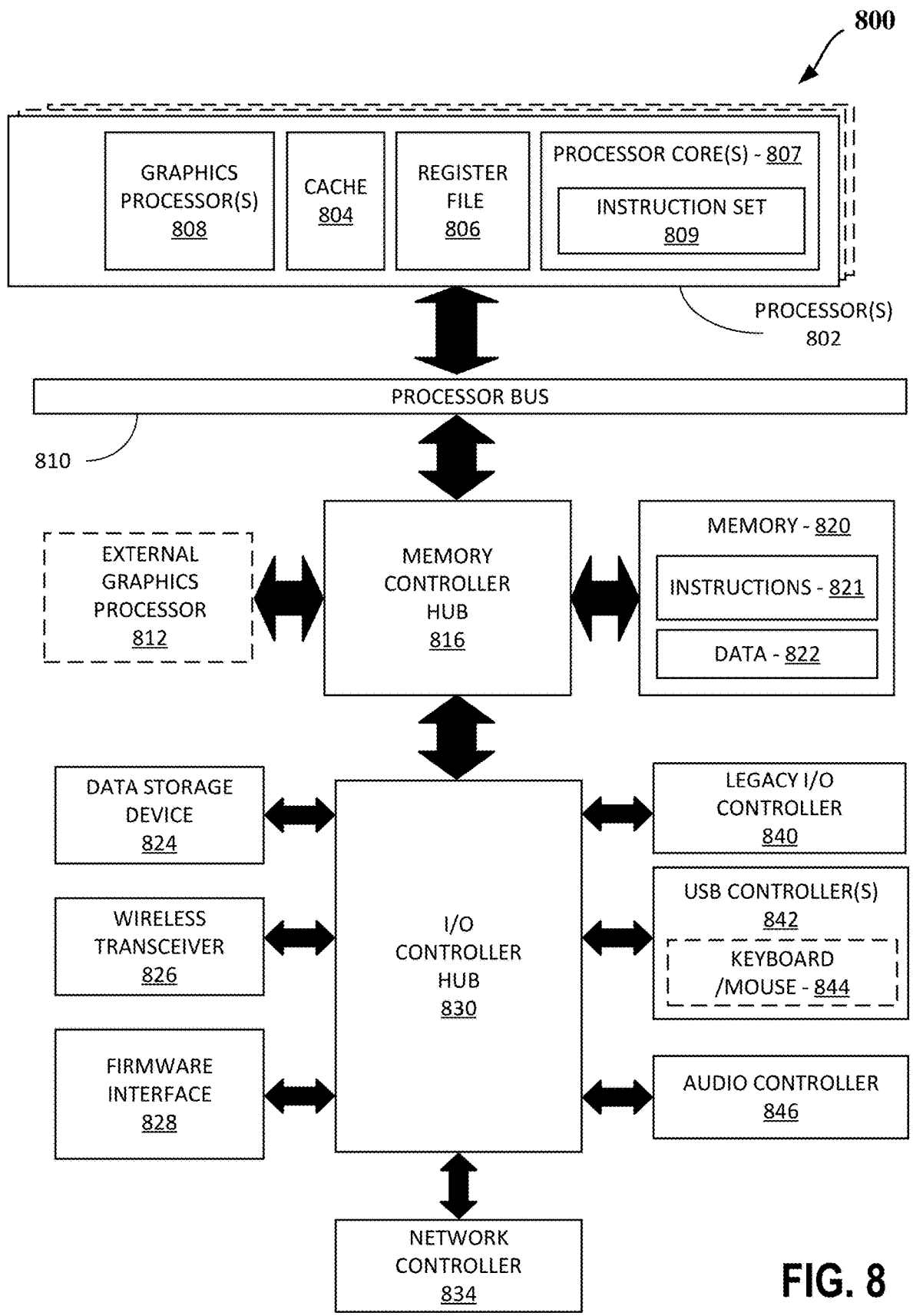
FIG. 8 is a block diagram of a processing system, according to an embodiment.

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 810 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random access memory (DRAM) device, a static random access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

Figure 9:
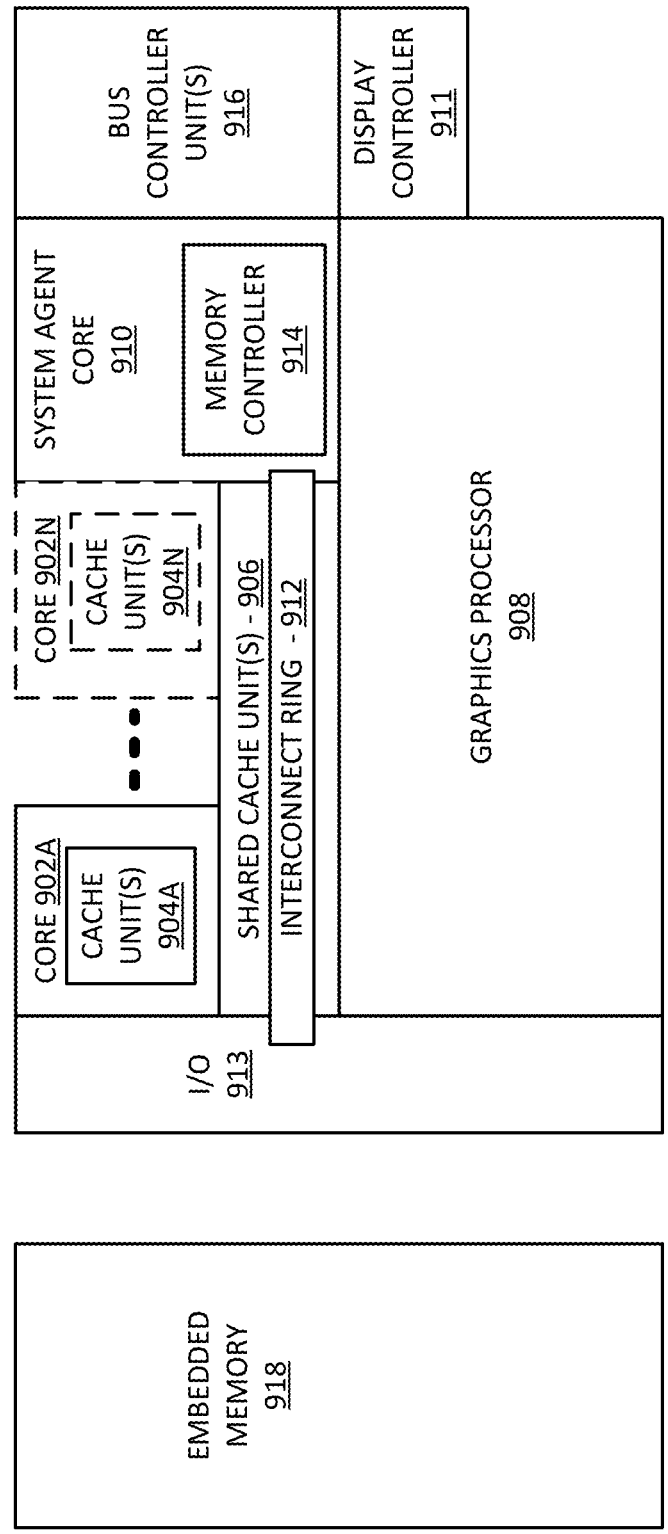
FIG. 9 is a block diagram of an embodiment of a processor having one or more processor cores, according to some embodiments.

FIG. 9 is a block diagram of an embodiment of a processor 900 having one or more processor cores 902A to 902N, an integrated memory controller 914, and an integrated graphics processor 908. Those elements of FIG. 9 having the same reference numbers (or names) as the elements of any other figure herein can operate or function in any manner similar to that described elsewhere herein, but are not limited to such. Processor 900 can include additional cores up to and including additional core 902N represented by the dashed lined boxes. Each of processor cores 902A to 902N includes one or more internal cache units 904A to 904N. In some embodiments each processor core also has access to one or more shared cached units 906.

The internal cache units 904A to 904N and shared cache units 906 represent a cache memory hierarchy within the processor 900. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A to 904N.

In some embodiments, processor 900 may also include a set of one or more bus controller units 916 and a system agent core 910. The one or more bus controller units 916 manage a set of peripheral buses, such as one or more Peripheral Component Interconnect buses (e.g., PCI, PCI Express). System agent core 910 provides management functionality for the various processor components. In some embodiments, system agent core 910 includes one or more integrated memory controllers 914 to manage access to various external memory devices (not shown).

In some embodiments, one or more of the processor cores 902A to 902N include support for simultaneous multi-threading. In such embodiment, the system agent core 910 includes components for coordinating and operating cores 902A to 902N during multi-threaded processing. System agent core 910 may additionally include a power control unit (PCU), which includes logic and components to regulate the power state of processor cores 902A to 902N and graphics processor 908.

In some embodiments, processor 900 additionally includes graphics processor 908 to execute graphics processing operations. In some embodiments, the graphics processor 908 couples with the set of shared cache units 906, and the system agent core 910, including the one or more integrated memory controllers 914. In some embodiments, a display controller 911 is coupled with the graphics processor 908 to drive graphics processor output to one or more coupled displays. In some embodiments, display controller 911 may be a separate module coupled with the graphics processor via at least one interconnect, or may be integrated within the graphics processor 908 or system agent core 910.

In some embodiments, a ring based interconnect unit 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring interconnect 912 via an I/O link 913.

The exemplary I/O link 913 represents at least one of multiple varieties of I/O interconnects, including an on package I/O interconnect which facilitates communication between various processor components and a high-performance embedded memory module 918, such as an eDRAM (or embedded DRAM) module. In some embodiments, each of the processor cores 902 to 902N and graphics processor 908 use embedded memory modules 918 as a shared Last Level Cache.

In some embodiments, processor cores 902A to 902N are homogenous cores executing the same instruction set architecture. In another embodiment, processor cores 902A to 902N are heterogeneous in terms of instruction set architecture (ISA), where one or more of processor cores 902A to 902N execute a first instruction set, while at least one of the other cores executes a subset of the first instruction set or a different instruction set. In one embodiment processor cores 902A to 902N are heterogeneous in terms of microarchitecture, where one or more cores having a relatively higher power consumption couple with one or more power cores having a lower power consumption. Additionally, processor 900 can be implemented on one or more chips or as an SoC integrated circuit having the illustrated components, in addition to other components.

Figure 10:
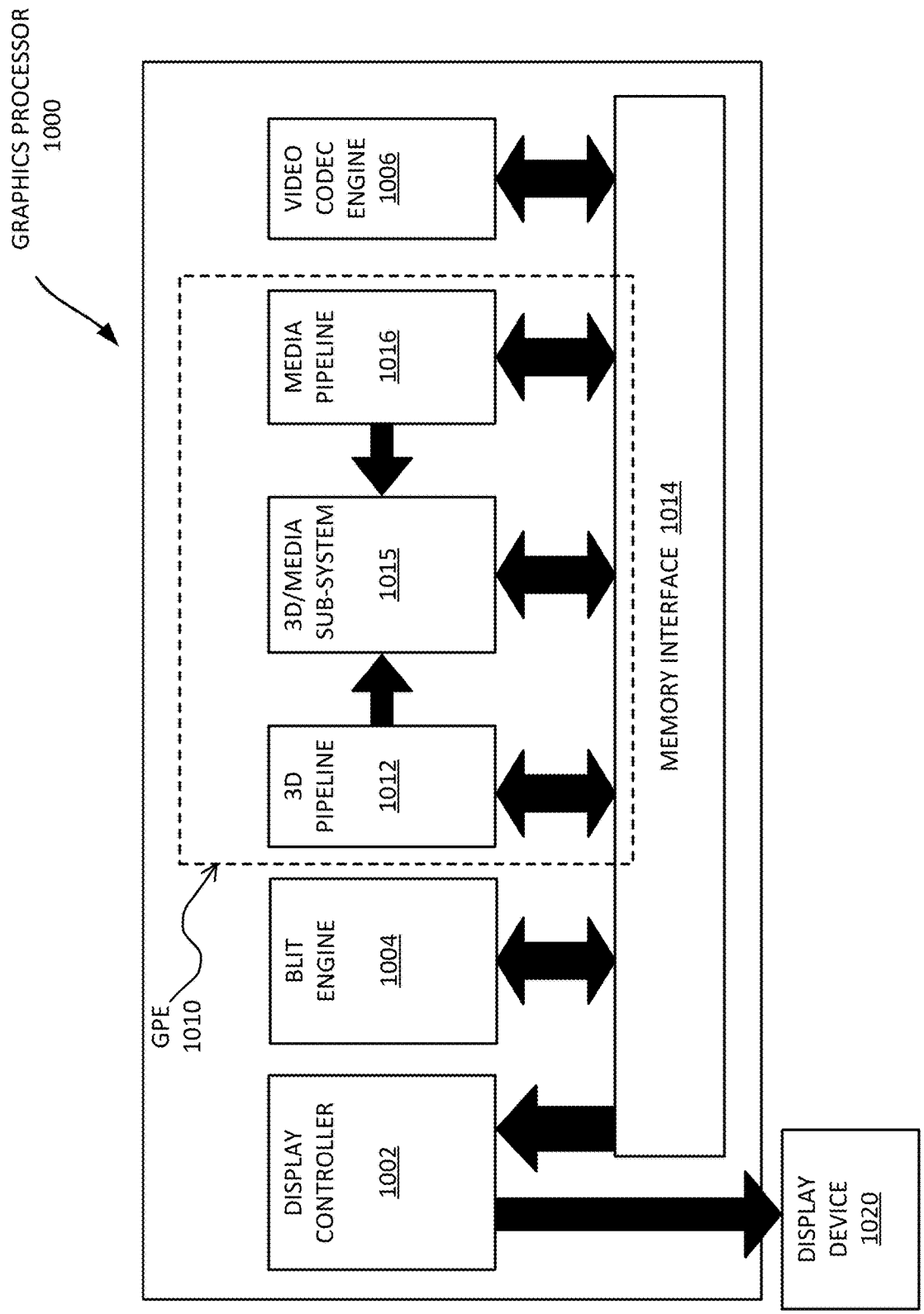
FIG. 10 is a block diagram of a graphics processor, according to an embodiment.

FIG. 10 is a block diagram of a graphics processor 1000, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1000 includes a memory interface 1014 to access memory. Memory interface 1014 can be an interface to local memory, one or more internal caches, one or more shared external caches, and/or to system memory.

In some embodiments, graphics processor 1000 also includes a display controller 1002 to drive display output data to a display device 1020. Display controller 1002 includes hardware for one or more overlay planes for the display and composition of multiple layers of video or user interface elements. In some embodiments, graphics processor 1000 includes a video codec engine 1006 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 1000 includes a block image transfer (BLIT) engine 1004 to perform two-dimensional (2D) rasterizer operations including, for example, bit-boundary block transfers. However, in one embodiment, 3D graphics operations are performed using one or more components of graphics processing engine (GPE) 1010. In some embodiments, graphics processing engine 1010 is a compute engine for performing graphics operations, including three-dimensional (3D) graphics operations and media operations.

In some embodiments, GPE 1010 includes a 3D pipeline 1012 for performing 3D operations, such as rendering three-dimensional images and scenes using processing functions that act upon 3D primitive shapes (e.g., rectangle, triangle, etc.). The 3D pipeline 1012 includes programmable and fixed function elements that perform various tasks within the element and/or spawn execution threads to a 3D/Media sub-system 1015. While 3D pipeline 1012 can be used to perform media operations, an embodiment of GPE 1010 also includes a media pipeline 1016 that is specifically used to perform media operations, such as video post-processing and image enhancement.

In some embodiments, media pipeline 1016 includes fixed function or programmable logic units to perform one or more specialized media operations, such as video decode acceleration, video de-interlacing, and video encode acceleration in place of, or on behalf of video codec engine 1006. In some embodiments, media pipeline 1016 additionally includes a thread spawning unit to spawn threads for execution on 3D/Media sub-system 1015. The spawned threads perform computations for the media operations on one or more graphics execution units included in 3D/Media subsystem 1015.

In some embodiments, 3D/Media subsystem 1015 includes logic for executing threads spawned by 3D pipeline 1012 and media pipeline 1016. In one embodiment, the pipelines send thread execution requests to 3D/Media subsystem 1015, which includes thread dispatch logic for arbitrating and dispatching the various requests to available thread execution resources. The execution resources include an array of graphics execution units to process the 3D and media threads. In some embodiments, 3D/Media subsystem 1015 includes one or more internal caches for thread instructions and data. In some embodiments, the subsystem also includes shared memory, including registers and addressable memory, to share data between threads and to store output data.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes an apparatus comprising: a plurality of storage entries to store error information to be detected at one or more physical lanes of an interface; and faulty lane detection logic circuitry to determine which of the one or more physical lanes is faulty or more likely to be faulty based at least in part on the stored error information for the one or more physical lanes of the interface, wherein the stored error information comprises historical error details for the one or more physical lanes of the interface. Example 2 includes the apparatus of example 1, wherein the historical error details comprises a total number of errors detected for at least one of the one or more physical lanes. Example 3 includes the apparatus of example 1, wherein the historical error details comprises a time stamp value for each error detected at the one or more physical lanes. Example 4 includes the apparatus of example 1, comprising logic to determine whether a detected error is one of a transient error and a persistent error. Example 5 includes the apparatus of example 4, comprising logic to cause performance of one or more service actions in response to detection of the persistent error. Example 6 includes the apparatus of example 1, wherein the stored error information is to be detected based at least on physical information for the one or more physical lanes. Example 7 includes the apparatus of example 6, wherein the physical information comprise one or more of: lane staggering information, lane swizzle information, lane reversal information, and lane polarity information. Example 8 includes the apparatus of example 1, comprising logic to generate a service alert in response to a determination that at least one of the one or more physical lanes is faulty or is likely to be faulty. Example 9 includes the apparatus of example 1, comprising error correction and retry logic circuitry to generate corrected data based at least in part on incoming data, error correction data, and physical lane information for the one or more physical lanes of the interface. Example 10 includes the apparatus of example 1, wherein the stored error information further comprises data to identify at least one probabilistic bad lane from the one or more physical lanes. Example 11 includes the apparatus of example 1, wherein the stored error information further comprises a count value for a number of errors detected for the one or more physical lanes. Example 12 includes the apparatus of example 1, wherein the stored error information further comprises a normalized count value for a number of errors detected for the one or more physical lanes. Example 13 includes the apparatus of example 1, wherein the stored error information further comprises a time stamp value for each error detected for the one or more physical lanes. Example 14 includes the apparatus of example 1, wherein the interface comprises a high speed input/output interface. Example 15 includes the apparatus of example 14, wherein the high speed input/output interface comprises: a Peripheral Component Interconnect express interface, a Ultra Path Interconnect interface, a Double Data Rate Random Access Memory interface, or a Compute Express Link interface. Example 16 includes the apparatus of example 1, wherein the one or more physical lanes are to propagate signals using differential signals or single ended signals. Example 17 includes the apparatus of example 1, wherein each the plurality of storage entries is to be stored in a register. Example 18 includes the apparatus of example 1, wherein a memory device comprises the plurality of storage entries. Example 19 includes the apparatus of example 1, wherein the faulty lane detection logic circuitry is to determine which of the one or more physical lanes is faulty or more likely to be faulty based at least in part on the stored error information for the one or more physical lanes of the interface and one or of: an Error Correcting Code (ECC) or a Cyclical Redundancy Code (CRC).

Example 20 includes one or more non-transitory computer-readable media comprising one or more instructions that when executed on a processor configure the processor to perform one or more operations to cause: a plurality of storage entries to store error information to be detected at one or more physical lanes of an interface; and faulty lane detection logic circuitry to determine which of the one or more physical lanes is faulty or more likely to be faulty based at least in part on the stored error information for the one or more physical lanes of the interface, wherein the stored error information comprises historical error details for the one or more physical lanes of the interface. Example 21 includes the one or more computer-readable media of example 20, further comprising one or more instructions that when executed on the at least one processor configure the at least one processor to perform one or more operations to cause determination of whether a detected error is one of a transient error and a persistent error. Example 22 includes the one or more computer-readable media of example 21, further comprising one or more instructions that when executed on the at least one processor configure the at least one processor to perform one or more operations to cause performance of one or more service actions in response to detection of the persistent error. Example 23 includes the one or more computer-readable media of example 20, further comprising one or more instructions that when executed on the at least one processor configure the at least one processor to perform one or more operations to cause detection of the stored error information based at least on physical information for the one or more physical lanes. Example 24 includes the one or more computer-readable media of example 20, further comprising one or more instructions that when executed on the at least one processor configure the at least one processor to perform one or more operations to cause generation of a service alert in response to a determination that at least one of the one or more physical lanes is faulty or is likely to be faulty. Example 25 includes the one or more computer-readable media of example 20, further comprising one or more instructions that when executed on the at least one processor configure the at least one processor to perform one or more operations to cause generation of corrected data based at least in part on incoming data, error correction data, and physical lane information for the one or more physical lanes of the interface.

Example 26 includes a method comprising: storing error information to be detected at one or more physical lanes of an interface in a plurality of storage entries; and determining, at faulty lane detection logic circuitry, which of the one or more physical lanes is faulty or more likely to be faulty based at least in part on the stored error information for the one or more physical lanes of the interface, wherein the stored error information comprises historical error details for the one or more physical lanes of the interface. Example 27 includes the method of example 26, further comprising determining whether a detected error is one of a transient error and a persistent error. Example 28 includes the method of example 27, further comprising performing one or more service actions in response to detection of the persistent error. Example 29 includes the method of example 26, further comprising detecting the stored error information based at least on physical information for the one or more physical lanes. Example 30 includes the method of example 26, further comprising generating a service alert in response to a determination that at least one of the one or more physical lanes is faulty or is likely to be faulty. Example 31 includes the method of example 26, further comprising generating corrected data based at least in part on incoming data, error correction data, and physical lane information for the one or more physical lanes of the interface.

Example 32 includes an apparatus comprising means to perform an operation as set forth in any preceding example. Example 33 includes machine-readable storage including machine-readable instructions, when executed, to implement an operation or realize an apparatus as set forth in any preceding example.

In various embodiments, one or more operations discussed with reference to FIG. 1 et seq. may be performed by one or more components (interchangeably referred to herein as "logic") discussed with reference to any of the figures.

In various embodiments, the operations discussed herein, e.g., with reference to FIG. 1 et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   a memory having a plurality of storage entries to store error information to be detected at one or more physical lanes of an interface;
   faulty lane detection logic circuitry, coupled to the interface, to detect which of the one or more physical lanes of the interface is faulty or likely to be faulty based at least in part on the stored error information for the one or more physical lanes of the interface, wherein the stored error information comprises historical error details for the one or more physical lanes of the interface, wherein the stored error information further comprises a time stamp for each error detected for the one or more physical lanes of the interface; and
   logic circuitry to isolate at least one of the one or more physical lanes based on detection of faulty or likely faulty physical lanes by the faulty lane detection logic circuitry, and to perform one or more corrective actions on the at least one of the one or more physical lanes, the one or more corrective actions comprising electrical tuning, manual inspection, and board checking out.

2. The apparatus of claim 1, wherein the historical error details comprise a total number of errors detected for at least one of the one or more physical lanes.

3. The apparatus of claim 1, wherein the historical error details comprise a time stamp value for each error detected at the one or more physical lanes.

4. The apparatus of claim 1, comprising logic to determine whether a detected error is one of a transient error and a persistent error.

5. The apparatus of claim 4, comprising logic to cause performance of one or more service actions in response to detection of the persistent error.

6. The apparatus of claim 1, wherein the stored error information is to be detected based at least on physical information for the one or more physical lanes.

7. The apparatus of claim 6, wherein the physical information comprises one or more of: lane staggering information, lane swizzle information, lane reversal information, and lane polarity information.

8. The apparatus of claim 1, comprising logic to generate a service alert in response to a determination that at least one of the one or more physical lanes is faulty or is likely to be faulty.

9. The apparatus of claim 1, comprising error correction and retry logic circuitry to generate corrected data based at least in part on incoming data, error correction data, and physical lane information for the one or more physical lanes of the interface.

10. The apparatus of claim 1, wherein the stored error information further comprises data to identify at least one probabilistic bad lane from the one or more physical lanes.

11. The apparatus of claim 1, wherein the stored error information further comprises a count value for a number of errors detected for the one or more physical lanes.

12. The apparatus of claim 1, wherein the stored error information further comprises a normalized count value for a number of errors detected for the one or more physical lanes.

13. The apparatus of claim 1, wherein the interface comprises a high speed input/output interface.

14. The apparatus of claim 13, wherein the high speed input/output interface comprises: a Peripheral Component Interconnect express interface, an Ultra Path Interconnect interface, a Double Data Rate Random Access Memory interface, or a Compute Express Link interface.

15. The apparatus of claim 1, wherein the one or more physical lanes are to propagate signals using differential signals or single ended signals.

16. The apparatus of claim 1, wherein each the plurality of storage entries is to be stored in a register.

17. The apparatus of claim 1, wherein the faulty lane detection logic circuitry is to determine which of the one or more physical lanes is faulty or more likely to be faulty based at least in part on the stored error information for the one or more physical lanes of the interface and one or of: an Error Correcting Code (ECC) or a Cyclical Redundancy Code (CRC).

18. One or more non-transitory computer-readable media comprising one or more instructions that, when executed on a processor, configure the processor to perform:
   storing error information in a memory having a plurality of storage entries, the error information to be detected at one or more physical lanes of an interface;
   detecting which of the one or more physical lanes is faulty or more likely to be faulty based at least in part on the stored error information for the one or more physical lanes of the interface, wherein the stored error information comprises historical error details for the one or more physical lanes of the interface, wherein the stored error information further comprises a time stamp for each error detected for the one or more physical lanes of the interface; and
   isolating at least one of the one or more physical lanes based on detection of faulty or likely faulty physical lanes, and performing one or more corrective actions on the at least one of the one or more physical lanes, the one or more corrective actions comprising electrical tuning, manual inspection, and board checking out.

19. The one or more computer-readable media of claim 18, further comprising one or more instructions that, when executed on at least one processor, configure the at least one processor to perform one or more operations to cause determination of whether a detected error is one of a transient error and a persistent error.

20. The one or more computer-readable media of claim 19, further comprising one or more instructions that, when executed on the at least one processor, configure the at least one processor to perform one or more operations to cause performance of one or more service actions in response to detection of the persistent error.

21. The one or more computer-readable media of claim 18, further comprising one or more instructions that, when executed on at least one processor, configure the at least one processor to perform one or more operations to cause detection of the stored error information based at least on physical information for the one or more physical lanes.

22. The one or more computer-readable media of claim 18, further comprising one or more instructions that, when executed on at least one processor, configure the at least one processor to perform one or more operations to cause generation of a service alert in response to a determination that at least one of the one or more physical lanes is faulty or is likely to be faulty.

23. The one or more computer-readable media of claim 18, further comprising one or more instructions that, when executed on at least one processor, configure the at least one processor to perform one or more operations to cause generation of corrected data based at least in part on incoming data, error correction data, and physical lane information for the one or more physical lanes of the interface.

* * * * *